UNITED STATES PATENT OFFICE.

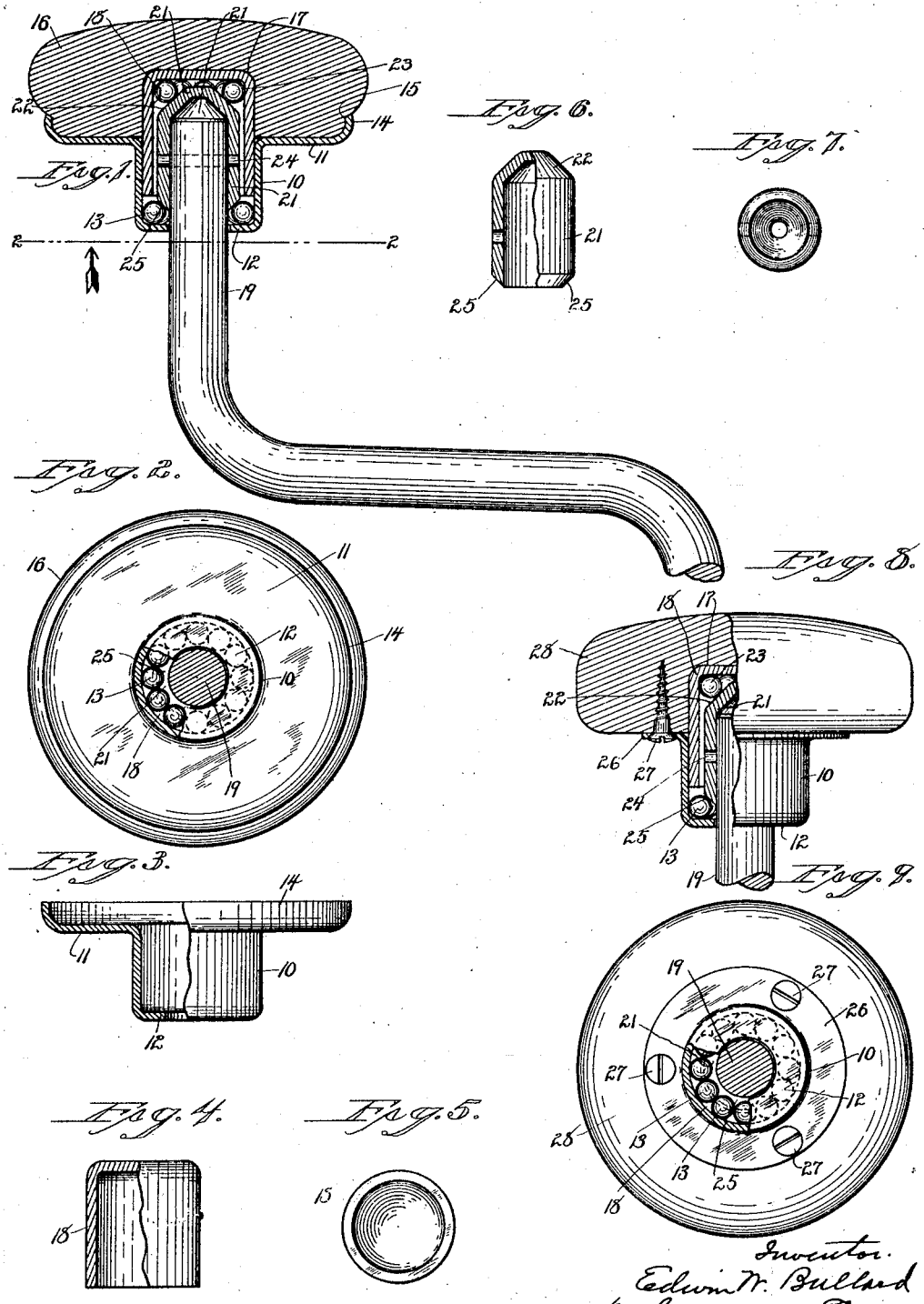
E. W. BULLARD.
BRACE HEAD.
APPLICATION FILED OCT. 4, 1920.
1,388,928.
Patented Aug. 30, 1921.

EDWIN W. BULLARD, OF WHITNEYVILLE, CONNECTICUT, ASSIGNOR TO WINCHESTER REPEATING ARMS CO., OF NEW HAVEN, CONNECTICUT, A CORPORATION.

BRACE-HEAD.

1,388,928.     Specification of Letters Patent.     Patented Aug. 30, 1921.

Application filed October 4, 1920. Serial No. 414,540.

*To all whom it may concern:*

Be it known that I, EDWIN W. BULLARD, a citizen of the United States, residing at Whitneyville, in the county of New Haven and State of Connecticut, have invented a new and useful Improvement in Brace-Heads; and I do hereby declare the following, when taken in connection with the accompanying drawings, and the characters of reference marked thereon, to be a full, clear, and exact description of the same, and which said drawings constitute part of this application, and represent, in—

Figure 1, a view in vertical central section of a brace head embodying my invention and shown as applied to the upper end of the brace crank, shown in elevation and broken away.

Fig. 2, a reverse plan view of the head with a portion of its assembling-cup broken away and the brace crank shown in transverse section on the line 2—2 of Fig. 1.

Fig. 3, a view, partly in elevation and partly in section, of the assembling-cup.

Fig. 4, a similar view of the ball-cup.

Fig. 5, a reverse plan view thereof.

Fig. 6, a view, partly in elevation and partly in section, of the ball-cone.

Fig. 7, a reverse plan view thereof.

Fig. 8, a view, partly in side elevation and partly in section, of one of the modified forms which my improvement may assume.

Fig. 9, a reverse plan view thereof with a portion of the assembling-cup broken away and with the brace crank in transverse section.

My invention relates to an improved head for bit braces, drill braces and kindred tools, the object being to produce a simple, durable and easy-running device.

With these ends in view, my invention consists in a brace head having certain details of construction and combination of parts, as will be hereafter described and pointed out in the claim.

In carrying out my invention as herein shown, I employ a one-piece assembling-cup comprising a cylindrical sleeve 10 and a mounting-flange 11, the sleeve being formed at its lower end with an inwardly-turned raceway flange 12, providing a raceway for a series of antifriction balls 13. The said flange 11 of the cup has its edge turned inward as at 14 into an annular groove 15 formed in the body 16, which is thus securely fastened to the assembling-cup. The body 16 is formed in its inner face with a circular central chamber 17 receiving the closed inner end of a cylindrical ball-cup 18 projecting from the inner face of the body and fitting snugly within the sleeve 10, which is large enough in diameter to receive the ball-cup 18 and the ball-cone 21, and to permit the former to clear the latter for the free rotation of the head upon the crank.

The upper end of the brace crank 19 mounts a ball-cone 21, having its upper end beveled as at 22 to provide a bearing for a series of antifriction balls 23 confined within the bottom of the ball-cup 18, as shown in Fig. 1, the said cone being fastened to the crank by a pin or rivet 24. The lower edge of the ball-cone 21 is formed with a bevel 25 coacting with the balls 13 and holding the same in place in the raceway formed by the inwardly-turned raceway flange 12. In this construction the ball-cone 21 may be viewed as the primary coupling member of the combination since it acts through the balls 13 to hold the brace head upon the crank upon which the head is free to turn.

In the modified construction shown by Figs. 8 and 9, the assembling-cup is formed with a narrow flange 26 receiving screws 27 entering the body 28. In this case the circumferential groove 15 in the body 16 is omitted.

I claim:

A brace head having an assembling-cup comprising a sleeve and a mounting-flange, a chambered head fastened to the said flange, a ball-cup inserted into the said head, from which it projects and which fits within the said sleeve, a brace crank, a ball cone fastened upon the upper end of the crank and formed at its ends with bearing faces, and antifriction balls located between the bottom of the ball-cup and the upper end of the cone and between the lower end of the cone and the bottom of the sleeve of the assembling-cup.

In testimony whereof, I have signed this specification in the presence of two subscribing witnesses.

EDWIN W. BULLARD.

Witnesses:
ERIK S. PALMER,
A. E. HODGSON.